United States Patent [19]
Horvath et al.

[11] Patent Number: 5,852,086
[45] Date of Patent: Dec. 22, 1998

[54] POLYAMIDE-ACRYLONITRILE BUTADIENE BLENDS WITH REDUCED GEL AND ANTIGEL AGENT

[75] Inventors: James Walter Horvath, Cuyahoga Falls; Faith Michelle Howard, Beachwood, both of Ohio

[73] Assignee: The Goodyear Tire & Rubber Company, Akron, Ohio

[21] Appl. No.: 729,635

[22] Filed: Sep. 30, 1996

[51] Int. Cl.[6] .................................................. C08K 5/53
[52] U.S. Cl. ........................ 524/130; 524/125; 524/128; 524/132; 524/147; 524/151; 524/303; 524/305; 524/291; 524/347; 524/178; 524/184
[58] Field of Search .................... 524/130, 132, 524/147, 303, 305, 347, 125, 151, 128, 291; 525/178, 184

[56] References Cited

U.S. PATENT DOCUMENTS

| | | | |
|---|---|---|---|
| 3,661,825 | 5/1972 | Horvath et al. | 524/347 |
| 3,872,055 | 3/1975 | Furukawa et al. | 524/147 |
| 3,903,197 | 9/1975 | Ishida et al. | 524/347 |
| 4,048,128 | 9/1977 | Eastman | 524/347 |
| 4,104,217 | 8/1978 | Leistner et al. | 524/305 |
| 4,209,431 | 6/1980 | Clark et al. | 524/147 |
| 5,187,012 | 2/1993 | Takahashi et al. | 524/347 |
| 5,276,258 | 1/1994 | Knobloch et al. | 524/330 |
| 5,331,034 | 7/1994 | Pfahler et al. | 524/347 |

*Primary Examiner*—Judy M. Reddick
*Attorney, Agent, or Firm*—J D Wolfe; Marc R Dion, Sr.

[57] ABSTRACT

An antigel agent composed of four types of antioxidants that allows polyamides to be blended with acrylonitrile/butadiene polymers with minimum generation of gels and yields a blend which can be extruded or sheeted to give a uniformed shaped product, for example, sheets and molded articles and is essentially free of plugging the screens of extruder used to extrude hose tube or sheet.

5 Claims, No Drawings

POLYAMIDE-ACRYLONITRILE BUTADIENE BLENDS WITH REDUCED GEL AND ANTIGEL AGENT

THE INVENTION

This invention relates to a method of making a homogeneous blend of acrylonitrile butadiene polymer and a polyamide exhibiting lower or minimized gel in the resulting blend and said blend. Low gel blends of acrylonitrile butadiene polymer and polyaryl polyamides or polyamides are highly desirable for extruding the tube or cover layers for a hose or a sheet material as the presence of gel particles results in weak spots in the hose tube or cover member or sheet as well as gives poor sheeting or extruding results. Also, the gel particles are prone to plug screens. More particularly, this invention supplies a novel antigel agent that reduces gel formation during making and using the blend.

THE PRIOR ART

The process of this invention produces an improved mixture—an alloy having resistance to gel formation where normally high gel is formed during the blending process. Thus, the blend has the nylon more uniformly dispersed therein. Usually the prior art processes blends the nylons of various types such as nylon 6,6-6, to nylon 12, etc, together with acrylonitrile butadiene polymers at temperatures sufficient to melt the nylon—usually in excess of 200° C. or higher, but these high temperatures cause the resulting blend to gel to yield a mixture having relative high gel content which causes the alloy when extruded or sheeted to exhibit weak spots that are undesirable as well as present adhesion problems and screen plugging difficulties. To prevent or reduce the gel formation, these blends are made at lower temperatures at the expense of longer processing time and frequently non-homogeneous parts as the nylon is not uniformly dispersed in the blend.

SUMMARY OF THE INVENTION AND BEST MODE

We have discovered that the presence of a special package of special chemicals or antigel agents during the blending of the acrylonitrile/butadiene polymer and the polyaramide or polyamide allows the blending to be done at a higher temperature while reducing the gel formation to get a more uniform dispersion in a shorter mixing time. The resulting blend is essentially free of visual gel as determined by observation of a sheet of the blend under the microscope where the gel appears as globs or the like in the sheet. These globs are more distinct when carbon black is present on or in the blend. Of course, the usual ASTM method of measuring gel may be used but it has a time factor disadvantage relative to viewing a sheet under the microscope.

Normally, these special packages of chemicals or antigel agents are added to the acrylonitrile/butadiene polymers and polyamide at or during the blending operation with the materials being blended in a heated mixer that is heated to or above the melting point of the polyamide. Usually the chemicals of the special package are added to the preferably finely divided acrylonitrile/butadiene polymer, but on the other hand, they may be added to the particular polyalkylamide or polyarylamide such as the nylons 6,6-6,7,8,12, etc., before being blended. Sometimes it is easier to add during the blending rather than to the individual parts of the blend. The special chemical package is used in 1 to 6% by weight based on a 100 parts of the blend of acrylonitrile/butadiene and polyamide, such as nylon, but 3–4% appears to be the most economical for the end results.

Although the acrylonitrile/butadiene polymers can be made in from about 5 to about 95% weight range, they are available commercially in 4 well known grades such as the ones where the acrylonitrile content of the blend is 22 to 33% by weight.

Since the nylon polymers such as 6-6,6 to 12 require a temperature of 200° C. and higher, say 225° C. to be melted to permit the nylon polymers to be blended with acrylonitrile/butadiene the blending is usually done in a mixer that can be heated such as one of the well known extruder mixers, for instance, W/P Warner, Pfleiderer or Leistritz and Berstorff. Unless the nylon is heated near or above 200° C. to 225° C., it is extremely hard to get the nylon uniformly dispersed in the acrylonitrile/butadiene polymer, and when the acrylonitrile/butadiene is blended at these high temperatures, appreciable gels are obtained unless the antigel agent is present. Thus, the desirable uniform dispersion due to the gel is not obtained by the prior art process.

The addition of a blend of specific chemicals of the package or antigel agents allows the nylon and acrylonitrile/butadiene polymer to be heated to 200° C. to 225° C. without gel formation enhancement. A series of blends of 80 parts of acrylonitrile/butadiene polymer and 20 parts of nylon 6 was blended with special chemical packages hereafter listed and tested for gel formation.

Thus, 100 parts of acrylonitrile/butadiene particles that passed 3/16" screen had mixed therewith one of the special chemical packages listed below:

| PACKAGE A | |
|---|---|
| tris-nonylphenyl phosphite | 1.00 phr |
| octadecyl 3,5-di-tert-butyl-4-hydroxydrocinnamate | 1.00 phr |
| 2,5-di-tert-amylquinone | 0.25 phr |
| disterylthiodipropionate (DSTDP) | 0.20 phr |
| PACKAGE B | |
| U877A blend of 2:1 of (bis 2,4-di-tert-butylphenyl pentaerythritol diphosphite); and octadecyl 3,5-di-tert-butyl-4-hydroxyhydrocinnamate | 0.64 phr |
| 2,5-di-tert-amylquinone | 0.25 phr |
| DSTDP | 0.20 phr |
| PACKAGE C | |
| U877A | 0.80 phr |
| 2,5-di-tert-amylquinone | 0.25 phr |
| disterylthiodipropionate (DSTDP) | 0.20 phr |

Use of any one of these packages, i.e. A, B and C gave blends of essentially 0% by weight of gel.

The acrylonitrile/butadiene polymer containing the special chemical package was tested at 80 parts of polymer to 10 parts of special chemical package in a Haake Rheochord Machine to get a graph of torque versus time. One example of two types of phenolic antioxidants useful in this invention are the alylquinones, such as tetrabutylhydroquinone or tert-amylhydroquinone and the alkylate phenols. The alkyl substitute generally has from 1 to 10 carbon atoms with the butyl to heptyl radical being preferred. Examples of these highly desirable alkylhydroquinones are the di-p-t-butyl, di-p-t-amyl and di-p-t-octylhydroquinones.

Examples of the secondary or preventive antioxidants are bis(2,4-di-tert-butylphenyl)pentaerythritol diphosphite); and octadecyl 3-(3,5-di-tert-butyl-4-hydroxyphenyl) propionate; others are Weston 618 known as distearyl pentaerythritol diphosphite; Weston DOPI known as diisooctyl phosphite, which is relatively volatile; Weston PTP known as heptakis (dipropyleneglycol) triphosphite; Weston TDP is triisodecyl phosphite; Weston TIOP is triisooctyl phosphite; Weston TLP is trilauryl phosphite; Weston 430 is tris (dipropyleneglycol) phosphite; Weston 600 is diisodecyl pentaerythritol diphosphite; and Weston 399 is trisnonylphenyl phosphite. These are representative examples of these secondary antioxidants of the phosphite types.

Some of the examples of the organic phosphite are bis-(2,4-di-t-butylphenyl) pentaerythritol diphosphite, di-stearyl pentaerythritol diphosphite, di- and tri-alkyl phosphites of 7 to 20 carbon atoms, the di- and tri-alkyl pentaerythritol phosphites of 1 or 2 phosphite groups and the alkyl radical contains from 3 to 18 carbon atoms, the phenyl phosphites and their alkyl alkylate phosphites and glycolate phenyl phosphites.

Although the list of primary antioxidants as well as the secondary antioxidants are extremely large, we have found it desirable to select or screen the individual antioxidants useful in these packages by use of the Haake Rheocord 90 system where samples of the antioxidant and a pelletized (no larger than about 3/8 inch) acrylonitrile/butadiene are mixed in the Haake Rheochord system and the time versus TQ (torque) and TTQ (total torque) at the indicated temperature are graphed by the Haake Rheochord machine. The temperature range of the graph paper is usually from 0° C. to 250° C. Thus, by this method torque/temperature curve versus run time is generated with the Haake Rheochord system.

The Haake Rheochord system was used to test the antigel agent or the special antioxidant chemical package to see if the antigel agent reduces the gel level preferably to zero or near zero. The results of these experiments indicated a combination of four materials which gave the best results. The nylon/acrylonitrile butadiene alloy comprising 25 parts of nylon 6 and 75 parts of acrylonitrile/butadiene polymer and 3 parts of HiSil 233, a finely powdered silica, is used to aid the blending of the ingredients.

The special chemical packages or antigel agents, as indicated hereinbefore, are composed of four different types of antioxidants in a broad sense. Use of the individual antioxidants will not give the desired gel formation suppression during mixing of the nylon and acrylonitrile butadiene. Therefore, it is an aspect of this invention to disclose a new combination of matter as a new antigel agent.

The four different individual antioxidants may be classed as primary or chain breaking antioxidants such as the alkyl hydroquinones and the complex phenolic type such as alkyl phenol, alkyl phenyl phenol. The third class is the secondary or preventive antioxidants such as the organic phosphites listed hereinbefore. The fourth class is the thioester synergist such as dilarerylthiodipropionate, dimysterylthiodipropionate, ditridecylthiodipropionate, disterylthiodipropionate and related thioalkanoinc acid from 3 to 30 carbon atoms and alkylhydrocinnamate where alkyl is preferred of 4 or more carbons up to 18 carbons.

The four classes of special chemicals required to give a chemical antigel agent that allows the polyamides to be blended with acrylonitrile/butadiene without producing more than a minimum gel in the blend are as shown herein on parts per hundred of blend when the Recipes A, B and C for the antigel agent were run on the Haake Rheochord System.

TABLE 1

| | |
|---|---|
| alkyl hydroquinone | 0.1–0.4 |
| thioester synergist | 0.1–0.4 |
| organic phosphites | 0.3–0.9 |
| phenolic antioxidant | 0.5–1.5 |

The initial torque registered at the start of the Haake mixer was the peak torque i.e. 14 Nm which dropped to less than 8 Nm in about 1.6 minutes before rising to 8 Nm by 3 minutes and slowly settled to slightly less than 8 Nm at the end of 15 minutes of mixing with a peak temperature being about 235° C. and low temperature at the end of mixing being about 111° C. When the same blend without any antigel agent present was run, the torque at 0.01 to 3.0 minutes was essentially 11.9 Nm with minimum torque at about 6 minutes being 10.5 Nm and maximum torque being 13.5 Nm at 270° C. As these runs were repeated with a single antioxidant or stabilizer in the recipe, visual examination of the blend under a microscope indicated increase in gel with time.

The individual antioxidants do not suppress gel formation during the first to the third minute of mixing as indicated by torque developed during the mixing in the Haake Rheochord mixing machine as well as the antigel agents of this invention does. The individual antioxidants require a higher torque to stir the blend at three minutes time and a higher temperature whereas the antigel agents of this invention at three minute time permitted the blend to be stirred at a lower torque and a lower temperature. The lower torque and lower stir temperature of the invention antigel agents reduced the tendency of the blend to build gel content with the standard recipe. The standard recipe (55 gram sample) with and without different amounts of antigel agents was mixed in a Haake internal mixer while generating the Haake torque versus time curves to show the smoothness of the torque value after the blend reached its melting zone peak. The Haake mixer is set for 220° C. and is run for 15 minutes at 60 rpm for each sample.

Two control samples were run one of the control samples being acrylonitrile/butadiene polymer with 3 parts per hundred of HiSil 233, sometimes designated herein as the alloy, and the second control sample is the blend without antigel agent.

While certain representative embodiments and details have been shown for the purpose of illustrating the invention, it will be apparent to those skilled in this art that various changes and modifications may be made therein without departing from the spirit or scope of the invention.

What is claimed is:

1. A process of making a uniformly dispersed blend of acrylonitrile/butadiene polymer with a polyamide without gel formation comprising mixing the acrylonitrile/butadiene polymer with polyamide in the presence of a special chemical package consisting essentially of a mixture of alkylhydroquinone, thioester synergist, organic phosphite and an alkyl phenolic antioxidant at a temperature sufficient to melt the polyamide.

2. The process of claim 1 wherein the temperature is 200° C. to 225° C.

3. The process of claim 1 wherein an alkyl phenolic antioxidant is present in 0.5 to 2.5 phr of the special chemical package.

4. The process of claim 1 wherein the organic phosphite is present from 0.30 phr to 1.0 phr in the special chemical package.

5. The process of claim 4 wherein the organic phosphite is selected from the class consisting of the diphosphites and the triphosphites and their mixture.

* * * * *